(12) United States Patent
Peterson

(10) Patent No.: US 8,251,392 B1
(45) Date of Patent: Aug. 28, 2012

(54) DEVICE FOR PROVIDING MORE SECURE FOOT POSITIONING ON A MOTORCYCLE

(76) Inventor: Dean A. Peterson, Rapid City, SD (US)

(*) Notice: Subject to any disclaimer, the term of this patent is extended or adjusted under 35 U.S.C. 154(b) by 534 days.

(21) Appl. No.: 12/316,647

(22) Filed: Dec. 15, 2008

(51) Int. Cl.
*B62J 25/00* (2006.01)

(52) U.S. Cl. ......... 280/291; 280/163; 180/90.6; 74/564; 296/75

(58) Field of Classification Search .................. 280/291, 280/163; 74/564; 248/688; 180/90.6; 296/75; 84/232; 297/423.1, 423.17
See application file for complete search history.

(56) References Cited

U.S. PATENT DOCUMENTS

| | | | | |
|---|---|---|---|---|
| 1,261,442 | A * | 4/1918 | Rigby | 280/291 |
| 1,297,202 | A * | 3/1919 | McGiehan | 74/563 |
| 1,480,421 | A * | 1/1924 | Smith | 74/564 |
| 1,998,366 | A * | 4/1935 | Geyer | 280/163 |
| 2,460,494 | A * | 2/1949 | Eisenberg et al. | 338/128 |
| 4,237,752 | A * | 12/1980 | Hildebrecht | 477/125 |
| 4,470,321 | A * | 9/1984 | Girty | 74/473.16 |
| 4,546,993 | A | 10/1985 | Walker | |
| 4,728,121 | A * | 3/1988 | Graves | 280/748 |
| 4,768,799 | A * | 9/1988 | Millican | 280/291 |
| 4,802,684 | A * | 2/1989 | Bennett et al. | 280/291 |
| 4,852,900 | A * | 8/1989 | Nahachewski | 280/291 |
| 5,104,188 | A * | 4/1992 | Jefferson | 297/195.13 |
| 5,121,889 | A * | 6/1992 | Carey, Jr. | 244/234 |
| D350,921 | S | 9/1994 | Carroll | |
| 5,738,180 | A * | 4/1998 | Hofmann et al. | 180/291 |
| 5,806,379 | A * | 9/1998 | Nagano | 74/594.6 |
| 5,961,138 | A * | 10/1999 | Roark et al. | 280/291 |
| 6,017,045 | A * | 1/2000 | Dermody | 280/169 |
| 6,174,018 | B1 * | 1/2001 | Mikulski | 296/75 |
| D478,848 | S | 8/2003 | Rice | |
| 6,719,316 | B1 | 4/2004 | Anthony | |
| 6,893,038 | B2 | 5/2005 | Egan | |
| 7,104,157 | B1 | 9/2006 | Hilliard | |
| 7,114,739 | B2 | 10/2006 | Colano | |
| 7,121,572 | B1 * | 10/2006 | Jaffe et al. | 280/304.1 |
| D544,410 | S | 6/2007 | Johnson | |
| 7,497,291 | B1 * | 3/2009 | McKim | 180/90.6 |
| 7,757,583 | B1 * | 7/2010 | Reading | 74/564 |
| 7,793,961 | B2 * | 9/2010 | Day | 280/291 |
| 2004/0061301 | A1 * | 4/2004 | Andrews | 280/163 |
| 2005/0012300 | A1 | 1/2005 | Egan | |
| 2005/0188782 | A1 * | 9/2005 | Khiev | 74/560 |
| 2005/0241547 | A1 * | 11/2005 | Colano | 108/50.14 |
| 2006/0055148 | A1 | 3/2006 | Patch | |
| 2007/0289404 | A1 * | 12/2007 | Smith | 74/564 |
| 2008/0111339 | A1 * | 5/2008 | Suddaby et al. | 280/250.1 |
| 2009/0026729 | A1 * | 1/2009 | James et al. | 280/291 |

* cited by examiner

*Primary Examiner* — Lesley D Morris
*Assistant Examiner* — Maurice Williams
(74) *Attorney, Agent, or Firm* — Jeffrey A. Proehl; Woods, Fuller, Shultz & Smith, P.C.

(57) ABSTRACT

A device for retaining a user's foot on a motorcycle footboard is disclosed, such as a footboard having an upper surface and a perimeter edge. The device comprises a frame configured to mount on the footboard. The frame forms a perimeter to extend about a portion of the upper surface of the footboard. The frame defines an aperture that is configured such that the portion of the upper surface of the footboard is exposed when the frame is mounted on the footboard. The frame comprises a main portion, the main portion having a front end for positioning toward a front of the footboard and a back for positioning toward a back end of the footboard. The frame also comprises an extension portion extending from the main portion. The extension portion extends forwardly from the main portion. The device includes a securing structure for removably securing the frame to the footboard.

18 Claims, 3 Drawing Sheets

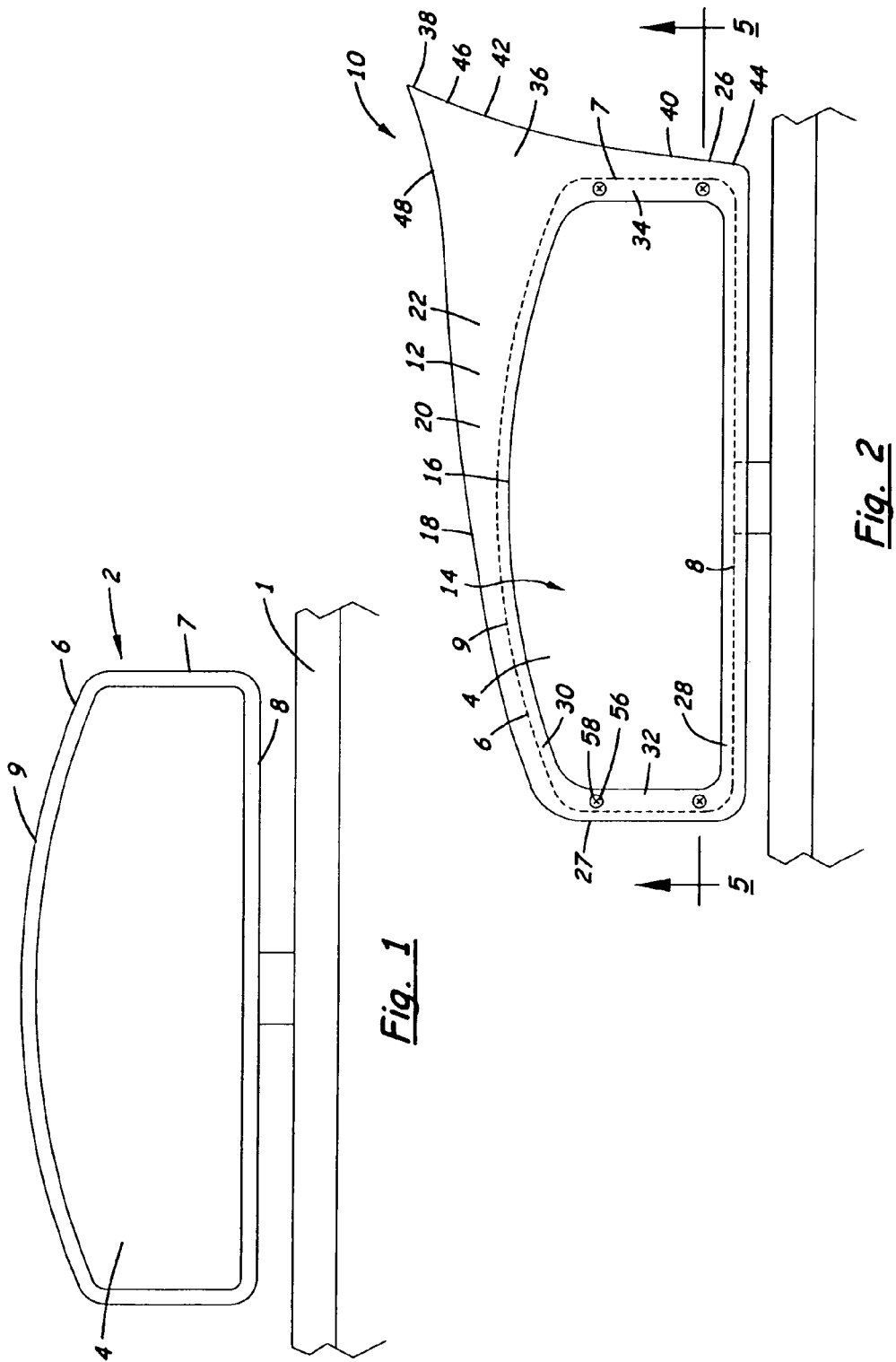

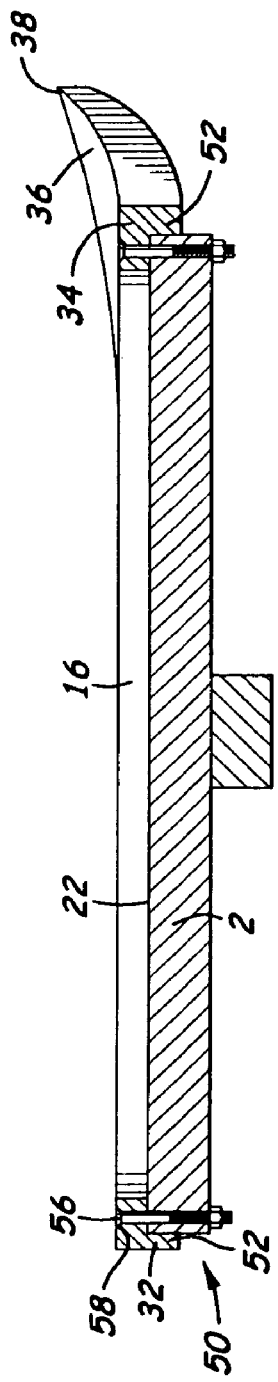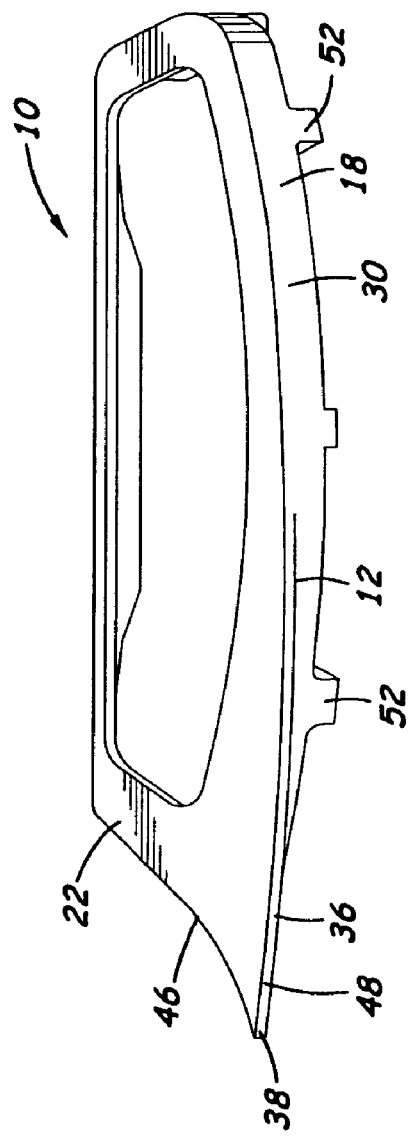

DEVICE FOR PROVIDING MORE SECURE FOOT POSITIONING ON A MOTORCYCLE

BACKGROUND

1. Field

The present disclosure relates to motorcycle foot supports and more particularly pertains to a new device for providing a greater variety of secure foot positions on a motorcycle.

2. Description of the Prior Art

Motorcycle riders often enjoy long rides on their bikes. However, the rider often desires to change his or her body position to "stretch out" for greater comfort and to help avoid stiffness from remaining in the same position for an extended period of time and to assist blood circulation in the body. These factors are especially true for the rider's legs, as it can be difficult to reposition other portions of the rider's body and still maintain control over the bike. To support the feet of the rider during riding, the motorcycle often includes pegs, which are generally cylindrical in shape and extend outwardly from the frame of the motorcycle, and footboards, which also extend outwardly from the frame and include a platform with rounded corners and smooth perimeter edge (see FIG. 1).

Unfortunately, the number of different positions for the feet and legs of the rider on the motorcycle if generally limited to the number of foot pegs and/or footboards, and there are only so many different ways for the foot of the rider to be rested on the pegs or footboards without increasing the risk that the foot will inadvertently slip off of the peg or board, especially in a portion where the leg of the rider is somewhat extended for maximum comfort.

It is therefore believed that there is a need for a device that aids the rider of a motorcycle in positioning his or her foot on the motorcycle in a comfortable yet secure manner.

SUMMARY

In view of the foregoing disadvantages inherent in the known types of motorcycle foot supports now present in the prior art, the present disclosure describes a new device which may be utilized for providing a greater variety of secure foot positions on a motorcycle.

The present disclosure relates to a device for retaining a foot of a user on a footboard of a motorcycle, with the footboard having an upper surface and a perimeter edge. The device may comprise a frame configured to mount on the footboard. The frame may form a perimeter to extend about a portion of the upper surface of the footboard. The frame defined an aperture configured such that the portion of the upper surface of the footboard is exposed when the frame is mounted on the footboard. The frame comprises a main portion having a front end for positioning toward a front of the footboard and a back for positioning toward a back end of the footboard. The frame also comprises an extension portion extending from the main portion. The extension portion extends forwardly from the main portion. The device may also comprise a securing structure configured to removably secure the frame to the footboard.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do no t depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 1 is a schematic top view of a typical footboard of a motorcycle.

FIG. 2 is a schematic top view of a new device for providing more secure foot positioning on a motorcycle according to the present disclosure.

FIG. 5 is a schematic sectional view of the device, according to an illustrative embodiment, taken along line 5-5 of FIG. 2.

FIG. 6 is a schematic perspective view of the device, according to an illustrative embodiment.

DETAILED DESCRIPTION

Figure 3:
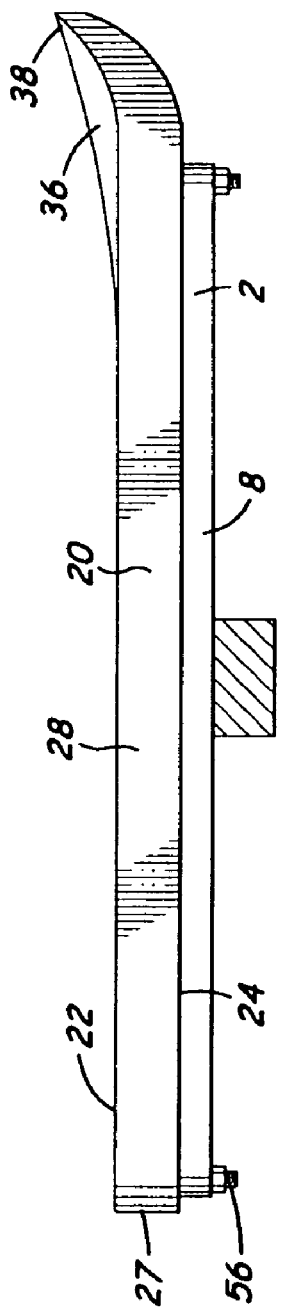
FIG. 3 is a schematic inner side view of the device, according to an illustrative embodiment.
Figure 4:
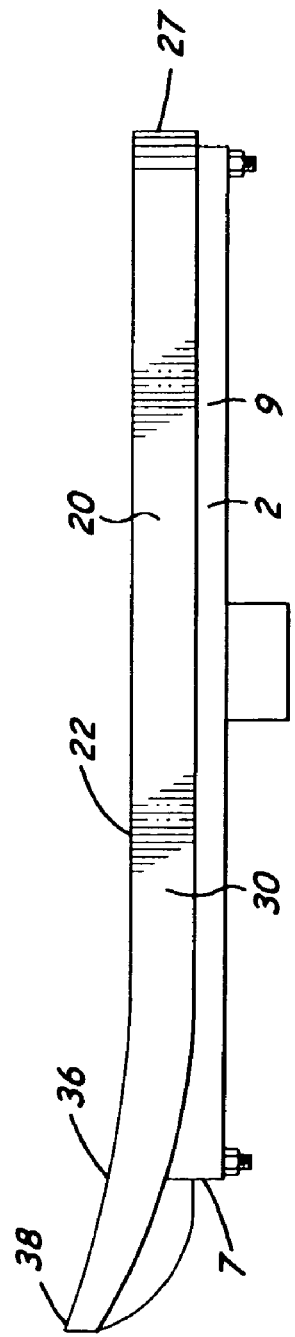
FIG. 4 is a schematic outer side view of the device, according to an illustrative embodiment.

With reference now to the drawings, and in particular to FIGS. 1 through 6 thereof, a new device for providing more secure foot positioning on a motorcycle embodying the principles and concepts of the disclosed subject matter will be described.

This disclosure relates to a device 10 that is useful for retaining the foot of a user on the footboard 2 of a motorcycle. A motorcycle typically has two footrests located on opposite sides of the motorcycle frame 1, and these footrests are typically of the peg type or the footboard type. The present device 10 finds the greatest benefit when employed on a footboard 2, such as is illustrated in FIG. 1. The shapes and positions of the two footboards on a motorcycle tend to be mirror images of each other, although this is not critical to the use of the device of the disclosure. The footboard of a motorcycle may have an upper surface 4 and a perimeter edge 6 that extends about the upper surface. The perimeter edge 6 of the footboard 2 may have various shapes, and in many cases is substantially rectangular, and may have a forward edge portion 7 oriented forwardly when the footboard is mounted on the motorcycle, toward an inner edge portion 8 that is oriented toward the motorcycle frame 1 and an outer edge portion 9 that is oriented away from the motorcycle frame. The outer edge portion 9 of the perimeter edge may be somewhat arcuate in shape. For the purposes of this disclosure, the terminology "foot" of the rider will be used to refer to the foot and any footwear that the rider may be wearing on his or her foot.

The device 10 may comprise a frame 12 that is configured to mount on the footboard 2. The frame 12 may form a perimeter to extend about the upper surface 4 of the footboard 2. The frame 12 may define an aperture 14 configured such that a portion of the upper surface 4 of the footboard is exposed when the frame is mounted on the footboard. The aperture 14 may be defined by an interior edge 16, and the aperture may be substantially rectangular in shape, although this shape is not critical and other shapes may be employed. The frame 12 may be configured to extend along the perimeter edge 6 of the footboard. The frame 12 may have an outer edge 18 that is located along the outermost periphery of the frame.

The frame 12 may include a main portion 20, and the main portion may have an upper surface 22 and a lower surface 24. The main portion 20 may have a front end 26 for positioning toward a front of the footboard and a back end 27 for positioning toward a back of the footboard.

The main portion 20 of the frame 12 may comprise an inner side section 28, an outer side section 30, a back section 32, and a front section 34, which may be collectively and integrally formed into the frame. The inner side section 28 may be substantially linear in shape. The outer side section 30 may be substantially arcuate in shape, with the portion of the interior edge 16 on the outer side section being substantially arcuate in shape and the portion of the outer edge 18 on the outer side section being arcuate. The specific shapes of the sections are not critical to the function of the device 10, and may be varied from that described above.

The back section 32 of the main portion 20 may extend between the outer side section 30 and the inner side section 28, and may be substantially linear in shape. The front section 34 may also extend between the outer side section 30 and the inner side section 28, and may be substantially linear in shape. Again, the specific shapes of the sections are not critical to the function of the device 10, and may be varied from that described above.

Significantly, the frame 12 may further comprise an extension portion 36 that tends to hold the foot of a rider on the footboard even when the foot of the rider is positioned toward or rested on the front edge of the footboard. The extension portion 36 tends to resist slippage of the rider's foot from the device 10, and thus from the footboard, particularly the front edge of the foorboard. The extension portion 36 extends from the main portion 20, and may terminate in a tip 38, which may be relatively pointed, but may be somewhat blunted. The extension portion 36 may extend forwardly from the main portion 20 so that a forward section 40 of the outer edge 18 of the frame tends to slope backwardly from a laterally outermost location 42 on the forward section of the outer edge to a laterally innermost location 44 on the forward section 40. This configuration feature tends to urge a foot (or footwear) rested or pressed against the forward section 40 in an inward direction toward the frame and body of the motorcycle, thus resisting the foot from slipping off of the frame 12 and the footboard 2 away from the motorcycle frame. The extension portion 36 may also extend outwardly away from the inner side section 28 to a degree to increase the length of the forward section 40 of the outer edge 18 and thus the distance between the tip 38 of the extension portion 36 and the motorcycle frame, thereby increasing the distance from the motorcycle frame that the device is effective for retaining the foot on the footboard.

The extension portion 36 may also slope upwardly toward the tip 38 such that the tip is raised above a plane of the upper surface 22 of the main portion. The upper surface of the extension portion 36 may thus be dished. This characteristic of the extension portion 36 tends to enhance the retaining function of the extension portion by urging the foot of the rider toward the center of the footboard and the motorcycle frame when the foot is at least partially rested on the extension portion. The raised tip 38 also tends to form a catch point that may dig into the soft sole of the footwear of the foot.

The extension portion 36 may have a substantially triangular configuration or shape, and may have a forward extension edge 46 and an outer side extension edge 48, which may meet at the tip 38. This shape is not critical to the function of the device 10, but is believed to enhance the effectiveness of the device for the desired purposes. The forward extension edge 46 may diverge from the forward edge portion 7 of the perimeter edge 6 of the footboard when the frame is mounted on the footboard, and the outer side extension edge 48 may diverge from the outer edge portion 9 of the perimeter edge of the footboard when the frame is mounted on the footboard.

The frame 12 may further include mounting portion 50 that is configured to engage the main portion 20 with the footboard, and may be configured to hold the frame to various locations on the perimeter edge 6 of the footboard 2. The mounting structure 50 may comprise a plurality of fingers 52 that engage locations on the perimeter edge 6 of the footboard. The plurality of fingers 52 may extend from the lower surface 24 of the main portion 20, and may be spaced about the aperture 14 in the main portion 20.

The device 10 may further include a securing structure to removably secure the frame 12 to the footboard 2. In some embodiments, the securing structure may comprise one or more securing members 56. The securing members 56 may be removably mounted on the frame 12, and may extend through apertures 58 in the frame 12. The securing members 56 may be positioned, for example, in the front section 34 and the back section 32 of the frame 12, as is illustrated in FIG. 2, although one or more of the apertures 58 and securing members 56 may be located on the inner side 28 and the outer side 30 of the frame 12 as well. The securing members 56 may pass through holes formed in the body of the footboard that correspond to the locations of the apertures 58 when the frame is placed over the footboard. In some embodiments of the device, the securing members 56 may comprise fasteners, and illustratively may comprise a threaded fastener or bolt, and a nut threaded onto the threaded fastener. Optionally, other retaining structures may be employed.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A device for retaining a foot of a user on a footboard of a motorcycle, the footboard having an upper surface and a perimeter edge, the device comprising:
    a frame configured to mount on the footboard, the frame forming a perimeter to extend about a portion of the upper surface of the footboard, the frame defining an aperture configured such that the portion of the upper surface of the footboard is exposed when the frame is mounted on the footboard, the frame comprising:
        a main portion having a front end for positioning toward a front of the footboard and a back for positioning toward a back end of the footboard; and
        an extension portion extending from the main portion, the extension portion extending forwardly from the main portion; and
    a securing structure configured to removably secure the frame to the footboard;
    wherein the extension portion has a forward extension edge and an outer side extension edge that converge at a tip of the extension portion, the forward extension edge diverging from a forward edge portion of the perimeter edge of the footboard when the frame is mounted on the footboard, and the outer side extension edge diverging from an outer edge portion of the perimeter edge of the footboard when the frame is mounted on the footboard.

2. The device of claim 1 wherein the extension portion extends laterally outwardly from the main portion.

3. The device of claim 1 wherein the tip has a point.

4. The device of claim 1 wherein an upper surface of the extension portion slopes upwardly toward the tip such that the tip is raised above a plane of an upper surface of the main portion.

5. The device of claim 1 wherein an upper surface of the extension portion slopes upwardly from an upper surface of the main portion of the frame.

6. The device of claim 1 wherein the extension portion has a substantially triangular configuration.

7. The device of claim 1 additionally comprising a retainer portion configured to engage locations on the perimeter edge of the footboard.

8. The device of claim 7 wherein the retainer portion comprises a plurality of fingers for engaging locations on the perimeter edge of the footboard.

9. The device of claim 1 wherein the securing structure comprises a plurality of securing members being removably mounted on the frame.

10. The device of claim 9 wherein the securing members extend through apertures formed in the frame.

11. The device of claim 9 wherein the securing members comprise threaded fasteners.

12. The device of claim 1 additionally comprising a retainer portion positioned along an outer perimeter edge of the main portion of the frame to engage locations on the perimeter edge of the footboard.

13. The device of claim 1 wherein the main portion has an upper surface and the extension portion has an upper surface, the upper surface of the extension portion being contiguous with the upper surface of the main portion.

14. The device of claim 1 wherein the main portion is configured to receive a portion of the footboard in a manner such that an upper surface of the main portion is positioned at a level above the supper surface of the footboard to provide a raised perimeter about the upper surface of the footboard when mounted on the footboard.

15. The device of claim 1 additionally comprising a retainer portion configured to engage locations on the perimeter edge of the footboard, the retainer portion comprising a plurality of fingers for engaging locations on the perimeter edge of the footboard, the main portion of the frame having an upper surface and a lower surface, the plurality of fingers extending from the lower surface of the main portion.

16. A device for retaining a foot of a user on a footboard of a motorcycle, the footboard having an upper surface and a perimeter edge, the device comprising:
    a frame configured to mount on the footboard, the frame forming a perimeter to extend about a portion of the upper surface of the footboard, the frame defining an aperture configured such that the portion of the upper surface of the footboard is exposed when the frame is mounted on the footboard, the frame comprising:
        a main portion having a front end for positioning toward a front of the footboard and a back for positioning toward a back end of the footboard; and
        an extension portion extending from the main portion, the extension portion extending forwardly from the main portion; and
    a securing structure configured to removably secure the frame to the footboard;
    a retainer portion configured to engage locations on the perimeter edge of the footboard;
    wherein the retainer portion comprises a plurality of fingers for engaging locations on the perimeter edge of the footboard;
    wherein the main portion of the frame has an upper surface and a lower surface, the plurality of fingers extending from the lower surface of the main portion.

17. The device of claim 8 wherein the fingers are spaced about the aperture in the main portion.

18. A device for retaining a foot of a user on a footboard of a motorcycle, the footboard having an upper surface and a perimeter edge, the device comprising:
    a frame configured to mount on the footboard, the frame forming a perimeter to extend about a portion of the upper surface of the footboard, the frame defining an aperture configured such that the portion of the upper surface of the footboard is exposed when the frame is mounted on the footboard, the frame comprising:
        a main portion, the main portion having a front end for positioning toward a front of the footboard and a back for positioning toward a back end of the footboard; and
        an extension portion extending from the main portion, the extension portion extending forwardly from the main portion; and
    a securing structure configured to removably secure the frame to the footboard;
    wherein the main portion is configured to receive a portion of the footboard in a manner such that an upper surface of the main portion is positioned at a level raised above the upper surface of the footboard to provide a continuous raised perimeter extending about the upper surface of the footboard when mounted on the footboard;
    wherein the extension portion extends laterally outwardly from the main portion;
    wherein the extension portion has a tip and the tip has a point;
    wherein an upper surface of the extension portion is contiguous with and slopes upwardly from an upper surface of the main portion toward the tip such that the tip is raised above a plane of an upper surface of the main portion;

wherein the extension portion has a substantially triangular configuration;

wherein the extension portion has a forward extension edge and an outer side extension edge that converge at a tip of the extension portion, the forward extension edge diverging from a forward edge portion of the perimeter edge of the footboard when the frame is mounted on the footboard, and the outer side extension edge diverging from an outer edge portion of the perimeter edge of the footboard when the frame is mounted on the footboard;

wherein the main portion is configured to receive a portion of the footboard in a manner such that an upper surface of the main portion is positioned at a level above the supper surface of the footboard to provide a raised perimeter about the upper surface of the footboard when mounted on the footboard;

a retainer portion positioned along an outer perimeter edge of the main portion of the frame and configured to engage locations on the perimeter edge of the footboard;

wherein the retainer portion comprises a plurality of fingers for engaging locations on the perimeter edge of the footboard;

wherein the main portion of the frame has an upper surface and a lower surface, the plurality of fingers extending from the lower surface of the main portion;

wherein the fingers are spaced about the aperture in the main portion;

wherein the securing structure comprises a plurality of securing members being removably mounted on the frame;

wherein the securing members extend through apertures formed in the frame; and wherein the securing members comprise threaded fasteners.

* * * * *